(12) United States Patent
Kulandai Samy et al.

(10) Patent No.: US 11,557,041 B2
(45) Date of Patent: Jan. 17, 2023

(54) DYNAMIC ARTIFICIAL INTELLIGENCE CAMERA MODEL UPDATE

(71) Applicant: Sensormatic Electronics, LLC, Boca Raton, FL (US)

(72) Inventors: Santle Camilus Kulandai Samy, Santa Clara, CA (US); Youngchoon Park, Milwaukee, WI (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 2 days.

(21) Appl. No.: 17/350,830

(22) Filed: Jun. 17, 2021

(65) Prior Publication Data

US 2022/0405939 A1   Dec. 22, 2022

(51) Int. Cl.
  *G06T 7/13*   (2017.01)
  *G06T 7/149*  (2017.01)
  *G06T 7/20*   (2017.01)

(52) U.S. Cl.
  CPC ............ *G06T 7/13* (2017.01); *G06T 7/149* (2017.01); *G06T 7/20* (2013.01); *G06T 2207/10016* (2013.01); *G06T 2207/20081* (2013.01)

(58) Field of Classification Search
  CPC .. G06T 7/20; G06T 7/13; G06T 7/149; G06T 2207/10016; G06T 2207/20081
  See application file for complete search history.

(56) References Cited

U.S. PATENT DOCUMENTS

| | | | | |
|---|---|---|---|---|
| 8,958,600 | B2 * | 2/2015 | Othmezouri | G06T 7/251 |
| | | | | 382/103 |
| 10,825,564 | B1 * | 11/2020 | Zhang | A61B 5/7267 |
| 11,427,195 | B1 * | 8/2022 | Pertsel | B60W 50/14 |
| 2005/0226464 | A1 * | 10/2005 | Sun | G06T 7/66 |
| | | | | 382/103 |
| 2019/0138829 | A1 | 5/2019 | Gurghian et al. | |
| 2019/0384291 | A1 | 12/2019 | Michalakis et al. | |
| 2020/0401853 | A1 | 12/2020 | Xiong et al. | |
| 2021/0134146 | A1 * | 5/2021 | Meshram | G08G 1/005 |

OTHER PUBLICATIONS

Extended European Search Report in EP22159166.2, dated Sep. 6, 2022, 9 pages.
Mittal, S., "A Survey on optimized implementation of deep learning models on the NVIDIA Jetson platform," Journal of Systems Architecture, Jan. 2019, vol. 97, pp. 428-442.

* cited by examiner

*Primary Examiner* — Shefali D Goradia
(74) *Attorney, Agent, or Firm* — ArentFox Schiff LLP

(57) ABSTRACT

A system may be configured to dynamically update deployed machine learning models. In some aspects, the system may receive sampled video information, generate first object detection information based on a cloud model and the sampled video information, and generate second object detection information based on a first edge model and the sampled video information. Further, the system may select, based on the first object detection information and the second object detection information, a plurality of training images from the sampled video information, detect motion information corresponding to motion of one or more detected objects within the plurality of training images, generate a plurality of annotated images based at least in part on the first object detection information and the motion information, and generate a second edge model based upon training the first edge model using the plurality of annotated images.

20 Claims, 7 Drawing Sheets

DYNAMIC ARTIFICIAL INTELLIGENCE CAMERA MODEL UPDATE

FIELD OF TECHNOLOGY

The present disclosure relates generally to video capture systems, and more particularly, to methods and systems for dynamically updating deployed machine learning (ML) models.

BACKGROUND

Many industries employ artificial intelligence technologies to analyze video information for a wide array of applications, e.g., object detection, object classification, etc. For example, in the retail sector, machine learning models may be employed to monitor entry and exit at a retail location, support traffic flow applications that monitor customer journeys within a retail location, and/or enable surveillance systems that detect unauthorized activity by retail customers with respect to retail articles offered for sale. Typically, video capture systems employ pre-built ML models that are not tailored for a particular video capture device capturing video information and/or particular camera scenes or environments represented in the video information. As a result, system accuracy may be significantly reduced due to false positives and/or false negatives.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, apparatuses, methods, and computer-readable media for dynamic refinement of artificial intelligence models. These systems, methods, and apparatuses will be described in the following detailed description and illustrated in the accompanying drawings by various modules, blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In an aspect, a method for dynamic refinement of an artificial intelligence model may comprise receiving sampled video information captured by a video capture device; generating first object detection information based on a cloud model and the sampled video information, the cloud model configured to detect objects within the sampled video information; generating second object detection information based on a first edge model and the sampled video information, the first edge model configured to detect objects within the sampled video information and employed at an edge device coupled with the video capture device; selecting, based on comparing the first object detection information to the second object detection information, a plurality of training images from the sampled video information; detecting motion information corresponding to motion of one or more detected objects within the plurality of training images; generating a plurality of annotated images based at least in part on comparing the first object detection information to the motion information; and generating a second edge model based upon training the first edge model using the plurality of annotated images.

In another aspect, a system for dynamic refinement of an artificial intelligence model may comprise a memory storing instructions, and at least one processor coupled with the memory and configured by the instructions to receive sampled video information captured by a video capture device; generate first object detection information based on a cloud model and the sampled video information, the cloud model configured to detect objects within the sampled video information; generate second object detection information based on a first edge model and the sampled video information, the first edge model configured to detect objects within the sampled video information and employed at an edge device coupled with the video capture device; select, based on comparing the first object detection information to the second object detection information, a plurality of training images from the sampled video information; detect motion information corresponding to motion of one or more detected objects within the plurality of training images; generate a plurality of annotated images based at least in part on comparing the first object detection information to the motion information; and generate a second edge model based upon training the first edge model using the plurality of annotated images.

In another aspect, a non-transitory computer-readable medium storing instructions that cause a processor to receive sampled video information captured by a video capture device; generate first object detection information based on a cloud model and the sampled video information, the cloud model configured to detect objects within the sampled video information; generate second object detection information based on a first edge model and the sampled video information, the first edge model configured to detect objects within the sampled video information and employed at an edge device coupled with the video capture device; select, based on comparing the first object detection information to the second object detection information, a plurality of training images from the sampled video information; detect motion information corresponding to motion of one or more detected objects within the plurality of training images; generate a plurality of annotated images based at least in part on comparing the first object detection information to the motion information; and generate a second edge model based upon training the first edge model using the plurality of annotated images.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
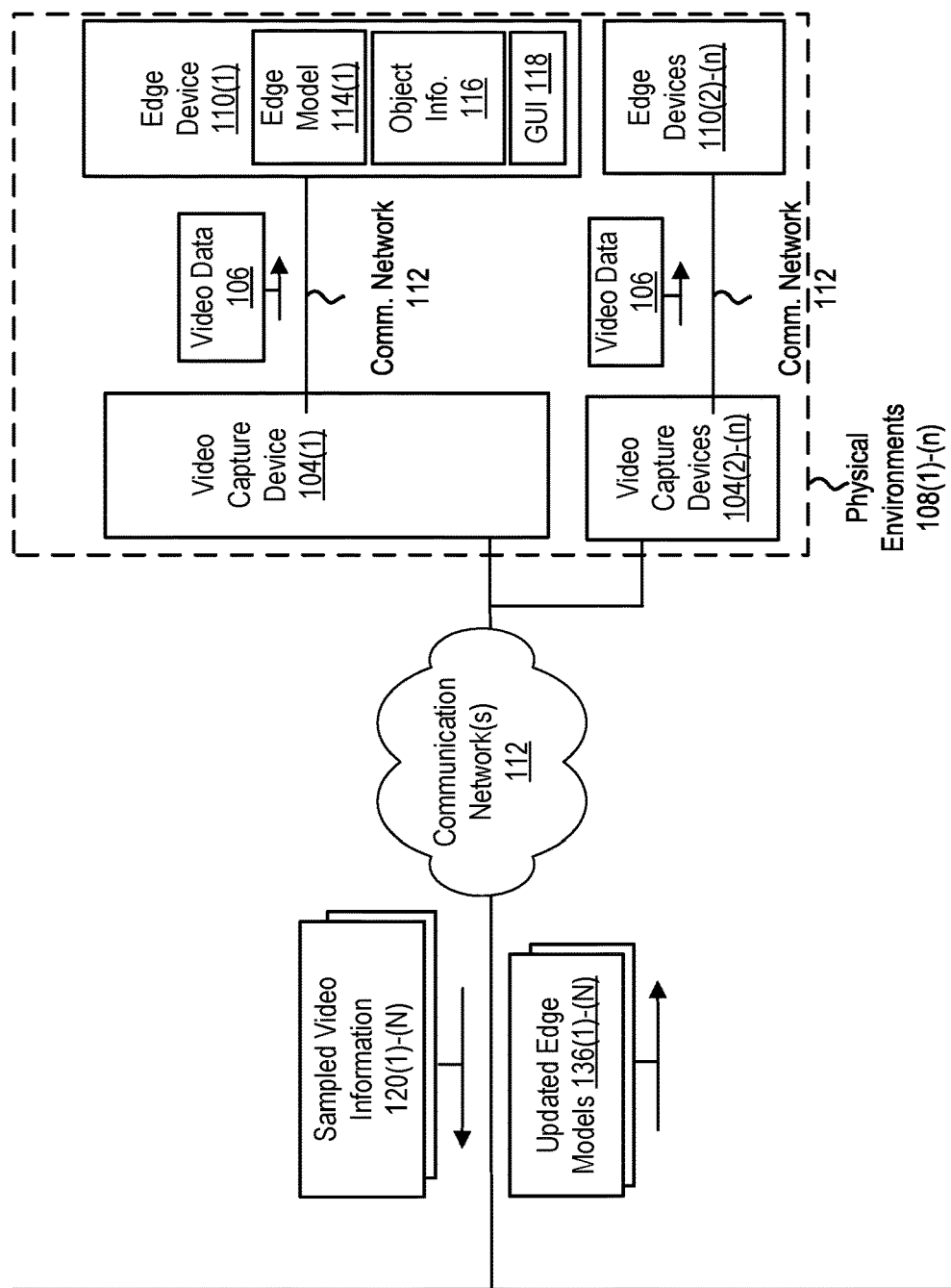
FIG. 1 is a block diagram of an example of a system for dynamically updating deployed ML models, according to some implementations.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Implementations of the present disclosure provide systems, methods, and apparatuses that provide cloud-based dynamic refinement of ML models employed for object detection. These systems, methods, and apparatuses will be described in the following detailed description and illustrated in the accompanying drawings by various modules, blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

In some implementations, one problem solved by the present solution is continued use of inaccurate ML models employed in edge devices ill-suited for ML model training. For example, the present disclosure describes systems and methods for dynamically updating ML models to reduce false negatives and false positives during an object detection workflow. Typically, video monitoring systems employ pre-built ML models that are not tailored for a particular video capture device and/or particular video capture scenes or environments. Further, the edge devices employed to support the video capture devices have limited means for updating the pre-built ML models in view of the particular attributes of a video capture device, particular video capture scenes or environments, and/or crowd sourced information related to a plurality of video capture devices. The present disclosure provides systems and methods for dynamically updating ML models employed in edge devices to improve ML model accuracy (e.g., reduce false negatives and false positives).

Referring to FIG. 1, in one non-limiting aspect, a system 100 may be configured to provide dynamic refinement of ML models. As illustrated in FIG. 1, the system 100 may include a management service 102, one or more video capture devices 104(1)-(n) configured to capture video data 106 in one or more physical environments 108(1)-(n), and one or more edge devices 110(1)-(N) configured to manage and analyze the video data 106. For example, the first video capture device 104(1) may capture video data 106 in a first physical environment 108(1), the nth video capture device 104(n) may capture video data 106 in an nth physical environment 108(n), and so forth. In addition, in some aspects, an edge device 110 may be a component of a video capture device 104 or located within a shared physical environment 108 as the video capture device 104. Further, the management service 102, the plurality of video capture devices 104(1)-(n), and/or the plurality of edge devices 110(1)-(n) may communicate via a communication network 112. In some implementations, the communication network 112 may include one or more of a wired and/or wireless private network, personal area network, local area network, wide area network, or the Internet.

As illustrated in FIG. 1, an edge device 110 may receive video data 106 from a corresponding video capture device 104. Further, the edge device 110 may employ an edge model 114 to determine object information 116 within the video data 106. In some aspects, the edge model 114 may be configured to detect objects within the video data 106, track motion of the detected objects within the video data 106, and store data corresponding to the detected objects and tracked motion of the detected objects as the object information 116. In some aspects, as described in detail herein, the edge model 114 may be trained specifically to detect and/or track objects within video data 106 captured by a particular video capture device 104. For example, the edge model 114(1) may be trained to detect and track objects based at least in part on one or more attributes of the physical environment 108 where the video capture device 104(1) is located, and/or one or more attributes of the video capture device 104(1). Additionally, an edge device 110 may include and/or be coupled with a graphical user interface (GUI) 118 for presenting the video data 106 and/or the object information 116.

Further, as illustrated in FIG. 1, the video capture devices 104(1)-(n) and/or edge devices 110(1)-(n) may periodically sample the video data 106 and transmit the sampled video information 120(1)-(n) to the management service 102. As described in detail herein, the management service 102 may dynamically refine the edge models 114(1)-(n) based on the sampled video information 120(1)-(n). In some embodiments, the video data 106 may be sampled according to one or more criteria and/or requirements. For example, the video data 106 may be sampled based on video capture device placement (e.g., overhead placement of a video capture device), placement attributes of a video capture device (e.g., placement height), field of view attributes, diversity of objects within the video data 106, object distance within the video data 106, illumination levels, date and/or time, diversity of background, diversity of object occlusion, indoor and outdoor scenes, diversity of persons (e.g., height, clothing, ethnicity, sex), variety of posture, etc.

The management service 102 may include a cloud model 122, the edge models 114(1)-(n), a model management component 124, an image selection component 126, a motion detection component 128, an image annotation component 130, and a model training component 132. The cloud model 122 may be configured to detect objects within the video data 106 and store data corresponding to the detected objects as the object information 134. Further, the cloud model 122 may have higher object detection accuracy capabilities than the edge models 114(1)-(n), while also being more resource intensive than the edge models 114(1)-(n). As such, in some aspects, the cloud model 122 may not be employed by the edge device 110, which may include less resources than the management service 102. For instance, in some aspects, the management service 102 may be a cloud computing environment, and the edge devices 110(1)-(n) may be local server devices. In addition, while the present disclosure describes edge models 114 and a cloud model 122 having object detection capabilities, the present disclosure may be applied to ML models having other uses.

The model management component 124 may be configured to manage the process of generating the edge models 114(1)-(n) and/or updated edge models 136(1)-(n). For instance, the model management component 124 may generate and deploy an edge model 114 in response to installation of a video capture device 104. In some other instances, the model management component 124 may periodically generate an updated edge model 136 in response to a passage of time, receipt of a predefined amount of sampled video information from a video capture device 104 associated with an edge model 114, and/or user feedback. Further, the model management component 124 may deploy an updated edge model 136 to a video capture device 104 based on the updated edge model 136 having an accuracy that exceeds the edge model 114 current employed in the video capture device 104 by a predefined threshold.

The image selection component 126 may be configured to determine a plurality of training images 138(1)-(n) from the sampled video information 120. In particular, the image selection component 126 may select the plurality of training images 138(1)-(n) based upon comparing the object information 116 generated by a local copy of the edge model 114 to the object information 134 generated by the cloud model 122.

For example, the object information 116 may include one or more bounding representations (e.g., bounding boxes, bounding segmentation, etc.) detected by the edge model 114 within an image frame of the sampled video information 120, and the object information 134 may include one or more bounding representations detected by the cloud model 122 within the image frame. Further, the image selection component 126 may select the image frame as one of the plurality of training images 138 based on a count of the one or more bounding representations detected by the edge model 114 not equaling a count of the one or more bounding representations detected by the cloud model 122.

As another example, the object information 116 may include one or more bounding representations detected by the edge model 114 within an image frame of the sampled video information 120, and the object information 134 may include one or more bounding representations detected by the cloud model 122 within the image frame. Further, the image selection component 126 may not select the image frame as one of the plurality of training images 138 based on a count of the one or more bounding representations detected by the edge model 114 equaling a count of the one or more bounding representations detected by the cloud model 122.

The motion detection component 128 may be configured to detect and track objects, as the motion detection information 142, within the plurality of training images 138(1)-(n). For example, the motion detection component 128 may be configured to detect bounding representations within the plurality of training images 138(1)-(n). In some aspects, the motion detection component 128 may employ an optical flow technique or frame segmentation approach for object detection. Further, the image annotation component 130 may be configured to annotate the plurality of training images 138(1)-(n) to generate the plurality of annotated images 140(1)-(n). In particular, the image annotation component 130 may annotate the plurality of training images 138(1)-(n) based upon comparing the object information 134 generated by the cloud model 122, the motion detection information 142 generated by the motion detection component 128, and/or the object information 116 generated by the edge model 114. As used herein, in some aspects, "annotating" may refer to applying bounding representations to the objects detected within an image frame and/or other forms of labeling of training data.

For example, the object information 134 may include one or more bounding representations detected by the cloud model 122 within an image frame of the plurality of training images 138(1)-(n), and the motion detection information 142 may include one or more bounding representations detected by the motion detection component 128 within the same image frame. Further, the image annotation component 130 may generate an annotated image of the plurality of annotated images 140(1)-(*n*) including the one or more bounding representations detected by the cloud model 122 based on the one or more bounding representations of the object information 134 matching the one or more of bounding representations of the motion detection information 142. As used herein, in some aspects, "matching" may refer to correspondence between two bounding representations, e.g., as illustrated by the bounding representations of detection results 218 (e.g., each bounding representation generated by the cloud model 122 has a corresponding bounding representation generated by the edge model 114 in a similar location). Further, in some aspects, matching may be determined by comparing a count of bounding representations generated by a first model to a count of bounding representations generated by a second model. Additionally, or alternatively, matching may be determined based on the difference between a location of a first bounding representation and a second bounding representation being less than a predefined threshold.

As another example, the object information 116 may include one or more bounding representations detected by the edge model 114 within an image frame of the sampled video information 120, the object information 134 may include one or more bounding representations detected by the cloud model 122 within the image frame, and the motion detection information 142 may include one or more bounding representations detected by the motion detection component 128 within the second image frame. Further, the image annotation component 130 may determine that the one or more bounding representations detected by the cloud model 122 do not match the one or more bounding representations detected by the motion detection component 128, and determine that each of the one or more bounding representations detected by the cloud model 122 but not the motion detection component 128 matches a bounding representation detected by the edge model 114. In response, the image annotation component 130 may generate an annotated image of the plurality of annotated images including the one or more bounding representations detected by the cloud model 122.

As another example, the object information 116 may include one or more bounding representations detected by the edge model 114 within an image frame of the sampled video information 120, the object information 134 may include one or more bounding representations detected by the cloud model 122 within the image frame, and the motion detection information 142 may include one or more bounding representations detected by the motion detection component 128 within the image frame. Further, the image annotation component 130 may determine that one or more bounding representations of the image frame detected by the edge model 114 are not detected by the cloud model 122 within the image frame, and determine that the one or more bounding representations detected by the edge model 114 and not the cloud model 122 do not match the one or more bounding representations detected by the edge model 114. In response, the image annotation component 130 may generate an annotated image of the plurality of annotated images including the one or more bounding representations detected by the cloud model 122.

As another example, the object information 116 may include one or more bounding representations detected by the edge model 114 within an image frame of the sampled video information 120, the object information 134 may include one or more bounding representations detected by the cloud model 122 within the image frame, and the motion detection information 142 may include one or more bounding representations detected by the motion detection component 128 within the image frame. Further, in some aspects, the image annotation component 130 may identify a review context based at least in part on two of the one or more bounding representations detected by the cloud model 122, the one or more bounding representations detected by the edge model 114, or the one or more bounding representations detected by the motion detection component 128. In some examples, a review context may correspond to an instance in which the more accurate cloud model 122 fails to detect an object that is detected by the less accurate edge model 114. For instance, the image annotation component 130 may detect a review context based on the count of the one or more bounding representations detected by the motion detection component 128 being greater than the count of the one or more bounding representations detected by the cloud model 122 (i.e., potential false negative by the cloud model 122). In some other instances, the image annotation component 130 may detect a review context based on one or more particular bounding representations of an image frame detected by the cloud model 122 and not being detected by the motion detection component 128, and the one or more particular bounding representations detected by the cloud model 122 not matching the one or more bounding representations detected by the edge model 114 (i.e., potential false positive by the cloud model 122). In yet still another instance, the image annotation component 130 may detect a review context based on a count of the one or more bounding representations detected by the edge model 114 being greater than a count of the one or more bounding representations detected by the cloud model 122, and the one or more bounding representations of the image frame detected by the motion detection component 128 not matching the one or more bounding representations of the image frame detected by the edge model 114 (i.e., potential moving false positive or accurate detection by edge model 114).

Once the image annotation component 130 determines the existence of a review context with respect to an image frame of the plurality of training images 138(1)-(*n*), a review GUI component 144 may prompt a user for annotation information identifying and/or confirming the correct bounding representations for the image frame, and receive the annotation information provided by user via the review GUI component 144. Further, the image annotation component 130 may generate an annotated image of the plurality of annotated images 140 based at least in part on the annotation information.

Further, the model management component 124 will split the plurality of annotated images 140 into a training set, a validation set, and a test set. Further, the model training component 132 may use the plurality of annotated images 140 to generate (e.g., train, validate, and test) the edge models 114 and the updated edge models 136. If the model training component 132 has not previously generated an edge model 114 for an edge device 110, the model training component 132 may perform a global update to a standard edge model 114 using the plurality of annotated images 140 associated with the plurality of edge devices 110(1)-(*n*). Alternatively, if the model training component 132 has previously generated an edge model 114 for a particular edge device 110, the model training component 132 may perform a local update to the edge model 114 previously deployed at the particular edge device using the plurality of annotated images 140 derived from sample video information 120 received from the particular edge device 110. As such, the model training component 132 may perform an iterative process to improve the accuracy of the edge model 114 deployed to a particular edge device 110 over time. For example, the model training component 132 may use the training set of the plurality of annotated images 140 derived from sample video information 120 received from the particular edge device 110 to re-train an edge model 114 to generate an updated edge model 136 to be deployed at the particular edge device 110.

In some aspects, the edge models 114 may be deep learning ML models, and the model training component 132 may employ transfer learning to train the ML models. As used herein, in some aspects, "transfer learning" may refer to using a result obtained by source items data items in feature extraction of target data items. In some aspects, a deep learning architecture may be a layered neural network in which the output of a first layer of neurons becomes an input to a second later of neurons, the output of the second layer of neurons becomes input to a third layer of neurons, and so forth. Further, the layered neural network may be trained to recognize a hierarchy features within an object recognition/detection application. For example, the first layer may learn to recognize simple features (e.g., edges), and the second layer, taking the output of the first layer as input, may learn to recognize combinations of features (e.g., simple shapes). Further, in some examples, higher layers may learn to represent complex shapes and/or common visual objects. In addition, in a transfer learning application, the model training component 132 may generate an updated edge model 136 based on the lower layers of a pre-existing edge model 114 and newer upper layers learned from the training set of the plurality of annotated images 140 derived from the most recent sampled video information 120 received from the corresponding edge device 110. Further, the model training component 132 may validate and test the updated edge model 136 using the validation and testing set of the plurality of annotated images 140 derived from the most recent sampled video information 120 received from the corresponding edge device 110. If the testing results indicate that the accuracy of the updated edge model 136 exceed a predefined value, the model management component 124 may send the updated edge model 136 to the edge device 110 for deployment.

Figure 2:
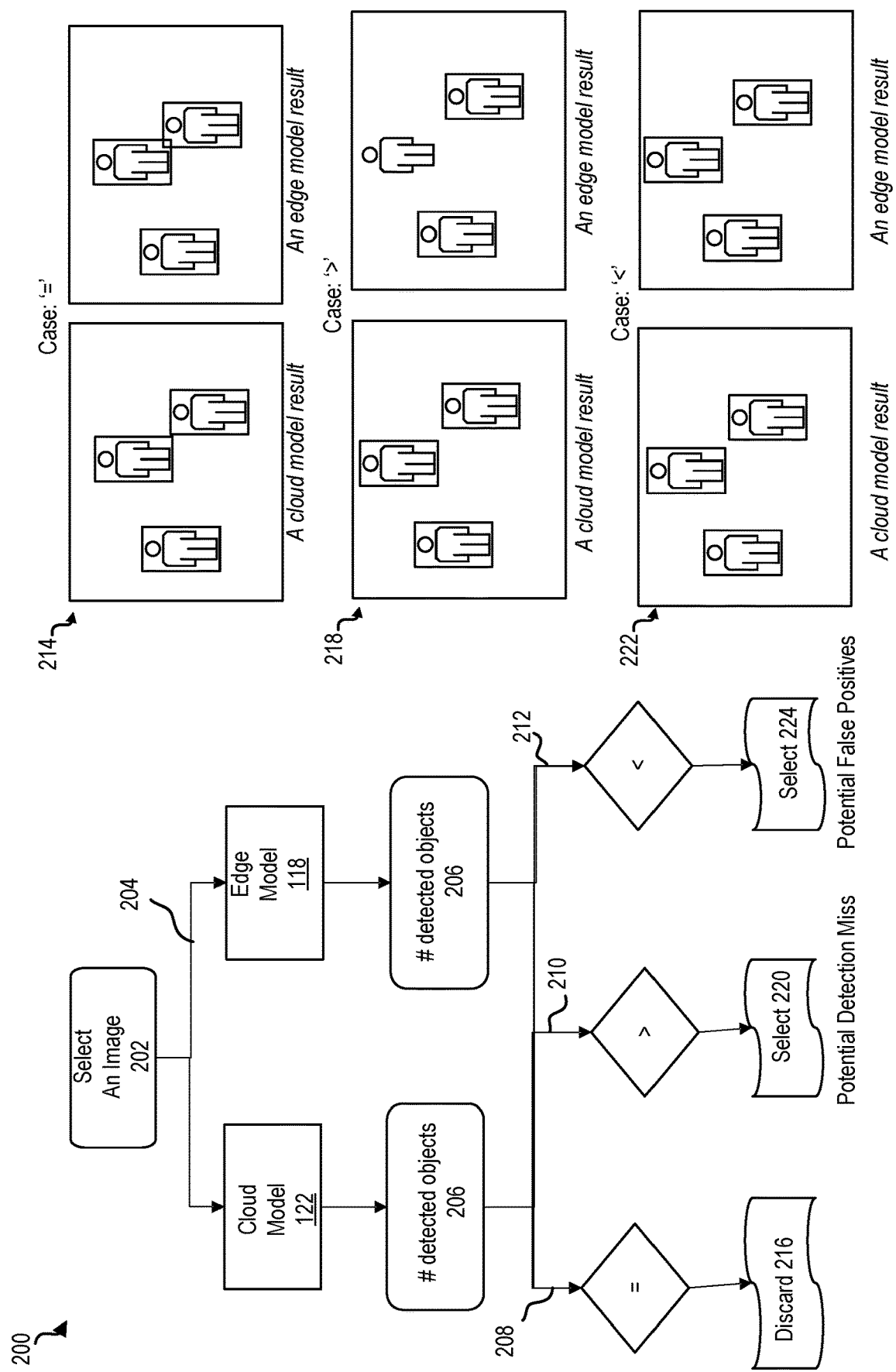
FIG. 2 is a flowchart of an example of image selection, according to some implementations.

FIG. 2 is a flow diagram 200 of an example of image selection, according to some implementations. As illustrated in FIG. 2, at step 202, the model management component 124 may select an image frame from within the sample video information 120. At step 204, the image frame is processed by the cloud model 122 to determine the object information 134 (e.g., one or more bounding representations) and the edge model 114 to determine the object information 116 (e.g., one or more bounding representations). At step 206, the image selection component 126 may determine a first count of the one or more bounding representations detected within the image frame by the cloud model 122 and determine a second count of the one or more bounding representations detected within the image frame by the edge model 114. At steps 208-212, the image selection component 126 may compare the first count to the second count. If the first count is equal to the second count, as illustrated by the detection results 214, the image selection component 126 may discard the image frame and will not select the image frame for the plurality of training images 138, at step 216. In addition, if the first count is greater than the second count, as illustrated in detection results 218, the image selection component 126 may select the image frame for the plurality of training images 138 and label the image frame as potentially including a false negative (i.e., failure of the edge model 114 to detect an object), at step 220. Further, if the first count is less than the second count, as illustrated in detection results 222, the image selection component 126 may select the image frame for the plurality of training images 138 and label the image frame as potentially including false positive (i.e., the edge model 114 inaccurately identified a region of the image frame as corresponding to an object), at step 224.

Figure 3:
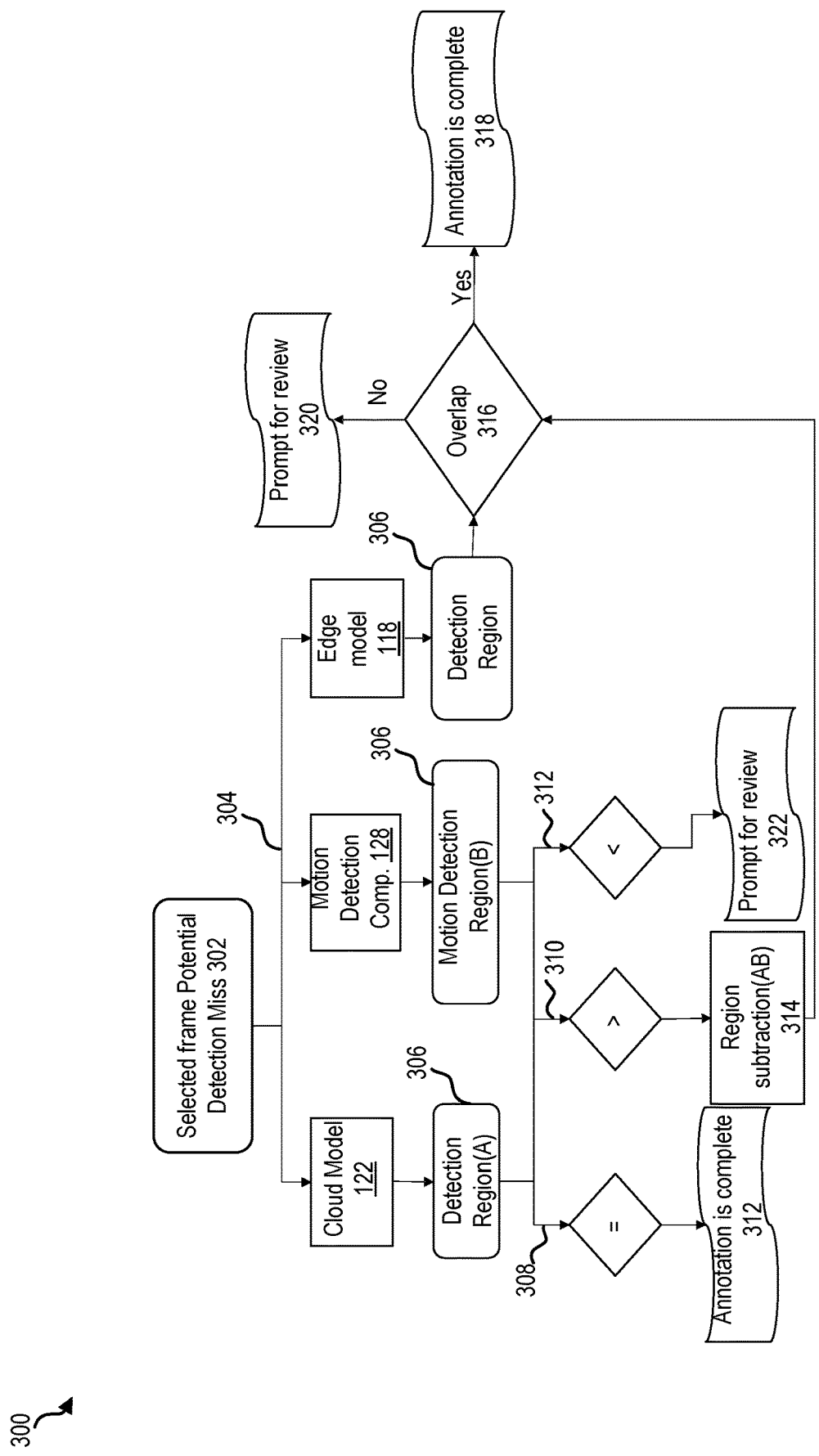
FIG. 3 is a flowchart of a first example of image annotation, according to some implementations.

FIG. 3 is a flow diagram 300 of a first example of image annotation, according to some implementations. As illustrated in FIG. 3, at step 302, the model management component 124 may select an image frame labeled as potentially including a false negative. At step 304, the image frame is processed by the cloud model 122 to determine the object information 134 (e.g., one or more bounding representations), the motion detection component 128 to determine the motion detection information (e.g., one or more bounding representations), and the edge model 114 to determine the object information 116 (e.g., one or more bounding representations). In some aspects, the image annotation component 130 may re-use the object information 134 and the object information 116 determined during image selection, as described with respect FIG. 2. At step 306, the image annotation component 130 may determine the one or more bounding representations detected within the image frame by the cloud model 122 and determine the one or more bounding representations detected within the image frame by the motion detection component 128. At steps 308-312, the image annotation component 130 may compare the one or more bounding representations detected within the image frame by the cloud model 122 to the one or more bounding representations detected within the image frame by the motion detection component 128. If the bounding representations match, the image annotation component 130 may annotate the image frame as one of the plurality of annotated images 140 using the one or more bounding representations detected by the cloud model 122, at step 312.

In addition, if the bounding representations do not match and a first count of bounding representations detected by the cloud model 122 is greater than a second count of bounding representations detected by the motion detection component 128, the image annotation component 130 may identify the one or more bounding representations detected by the cloud model 122 and not detected by the motion detection component, at step 314. At step 316, the image annotation component 130 may determine if the one or more identified bounding representations have overlapping bounding representations detected by the edge model 114. If overlap is detected by the image annotation component, the image annotation component 130 may annotate the image frame as one of the plurality of annotated images 140 using the one or more bounding representations detected by the cloud model 122, at step 318. Otherwise, the image annotation component 130 may prompt a user for annotation information via the GUI component 144, at step 320. Further, if the first count of bounding representations detected by the cloud model 122 is less than the second count of bounding representations detected by the motion detection component 128, the image annotation component 130 may prompt a user for annotation information via the GUI component 144, at step 322.

Figure 4:
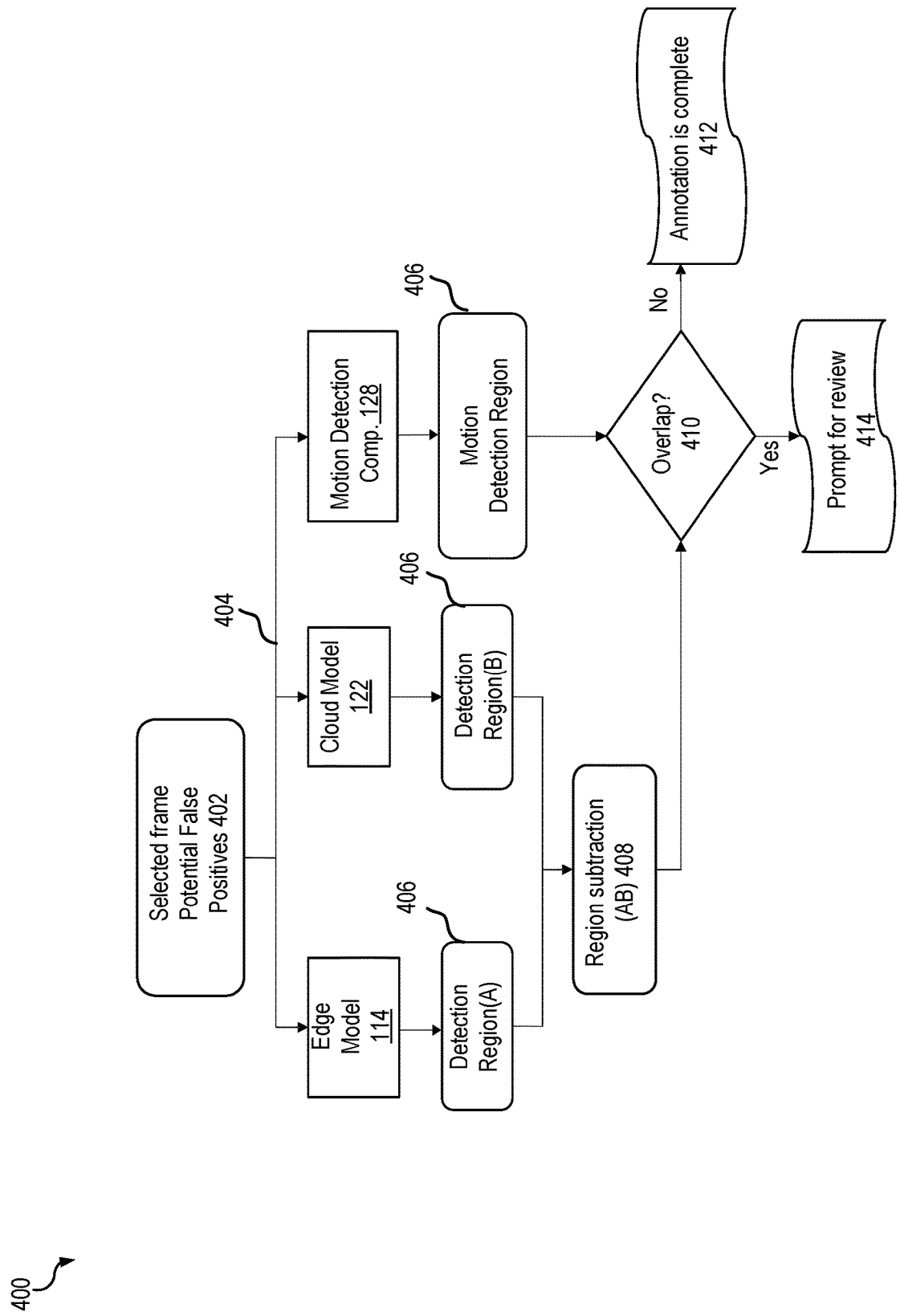
FIG. 4 is a flowchart of a second example of image annotation, according to some implementations.

FIG. 4 is a flow diagram 400 of a first example of image annotation, according to some implementations. As illustrated in FIG. 4, at step 402, the model management component 124 may select an image frame labeled as potentially including a false positive by the image selection component 126. At step 404, the image frame is processed by the cloud model 122 to determine the object information 134 (e.g., bounding representations), the motion detection component 128 to determine the motion detection information (e.g., bounding representations), and the edge model 114 to determine the object information 116 (e.g., bounding representations). In some aspects, the image annotation component may re-use the object information 134, motion detection information 142, and the object information 116 with respect to FIGS. 2-3. At step 406, the image annotation component 130 may identify the one or more bounding representations detected by the cloud model 122 and not detected by the edge model 114, at step 408. At step 410, the image annotation component 130 may determine if the one or more identified bounding representations have an overlapping bounding representations detected by the motion detection component 128. If overlap is not detected by the image annotation component 130, the image annotation component 130 may annotate the image frame as one of the plurality of annotated images 140 using the one or more bounding representations detected by the cloud model 122, at step 412. Otherwise, the image annotation component 130 may prompt a user for annotation information via the GUI component 144, at step 414. In some aspects, the annotation information may correct a potential false positive caused by object motion or confirm that the edge model 114 correctly detected one or more objects that were not detected by the cloud model 122.

Figure 5:
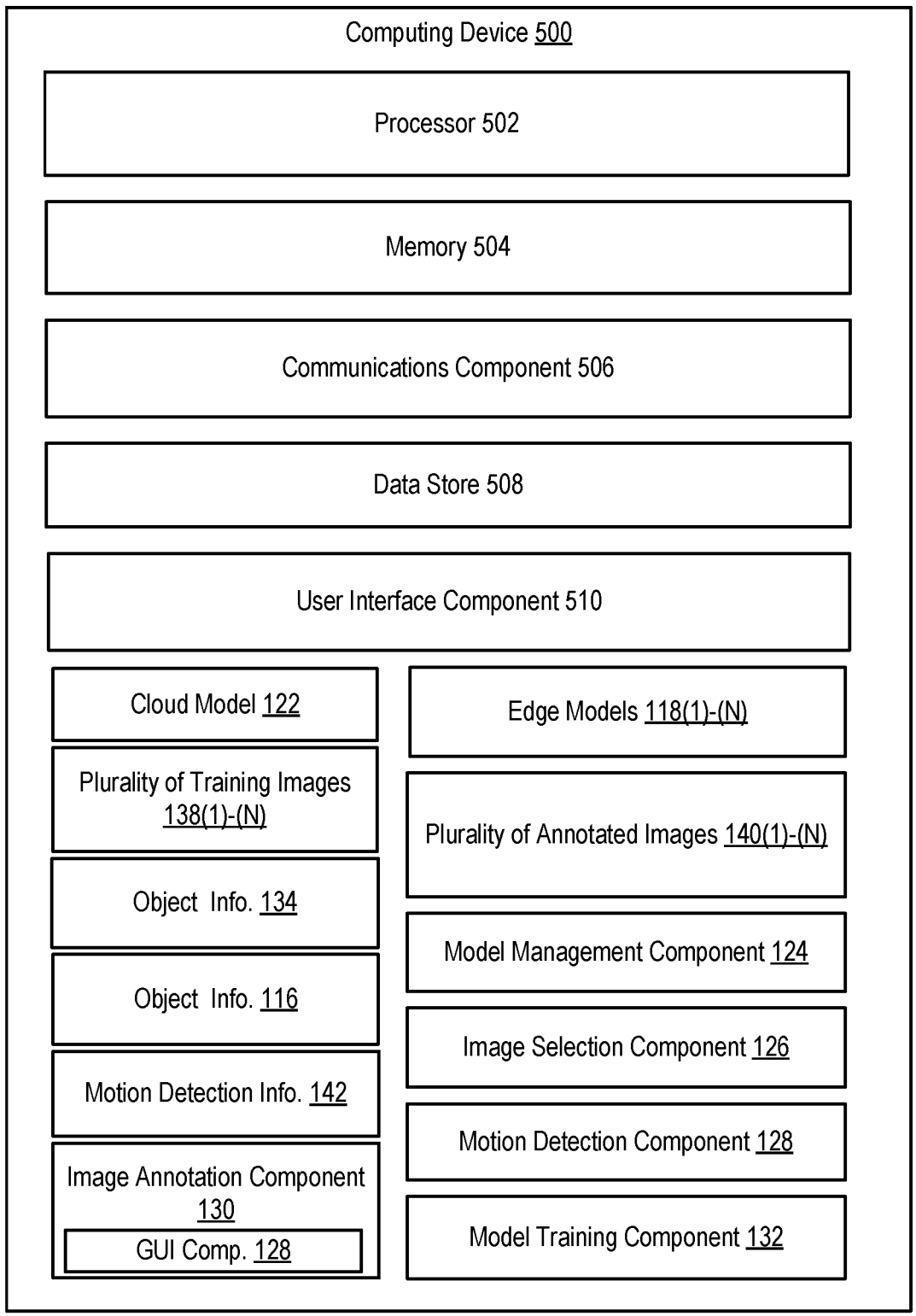
FIG. 5 is block diagram of an example of a management service configured to dynamically update deployed ML models, according to some implementations.

Referring to FIG. 5, a computing device 500 may implement all or a portion of the functionality described herein. The computing device 500 may be or may include or may be configured to implement the functionality of at least a portion of the system 100, or any component therein. For example, the computing device 500 may be or may include or may be configured to implement the functionality of the management service 102. The computing device 500 includes a processor 502 which may be configured to execute or implement software, hardware, and/or firmware modules that perform any functionality described herein. For example, the processor 502 may be configured to execute or implement software, hardware, and/or firmware modules that perform any functionality described herein with reference to the management service 102, or any other component/system/device described herein, e.g., the edge model 114, the cloud model 122, the model management component 124, the image selection component 126, the motion detection component 128, the image annotation component 130, the model training component 132, the object information 134, and the GUI component 144.

The processor 502 may be a micro-controller, an application-specific integrated circuit (ASIC), a digital signal processor (DSP), or a field-programmable gate array (FPGA), and/or may include a single or multiple set of processors or multi-core processors. Moreover, the processor 502 may be implemented as an integrated processing system and/or a distributed processing system. The computing device 500 may further include a memory 504, such as for storing local versions of applications being executed by the processor 502, related instructions, parameters, etc. The memory 504 may include a type of memory usable by a computer, such as random access memory (RAM), read only memory (ROM), tapes, magnetic discs, optical discs, volatile memory, non-volatile memory, and any combination thereof. Additionally, the processor 502 and the memory 504 may include and execute an operating system executing on the processor 502, one or more applications, display drivers, and/or other components of the computing device 500, e.g., the edge model 114, the cloud model 122, the model management component 124, the image selection component 126, the motion detection component 128, the image annotation component 130, the model training component 132, the object information 134, and the GUI component 144.

Further, the computing device 500 may include a communications component 506 configured to establish and maintain communications with one or more other devices, parties, entities, etc. utilizing hardware, software, and services. The communications component 506 may carry communications between components on the computing device 500, as well as between the computing device 500 and external devices, such as devices located across a communications network and/or devices serially or locally connected to the computing device 500. In an aspect, for example, the communications component 506 may include one or more buses, and may further include transmit chain components and receive chain components associated with a wireless or wired transmitter and receiver, respectively, operable for interfacing with external devices.

Additionally, the computing device 500 may include a data store 508, which can be any suitable combination of hardware and/or software, that provides for mass storage of information, databases, and programs. For example, the data store 508 may be or may include a data repository for applications and/or related parameters not currently being executed by processor 502. In addition, the data store 508 may be a data repository for an operating system, application, display driver, etc., executing on the processor 502, and/or one or more other components of the computing device 500, e.g., the edge model 114, the cloud model 122, the model management component 124, the image selection component 126, the motion detection component 128, the image annotation component 130, the model training component 132, the object information 134, and the GUI component 144.

The computing device 500 may also include a user interface component 510 operable to receive inputs from a user of the computing device 500 and further operable to generate outputs for presentation to the user (e.g., via a display interface to a display device). The user interface component 510 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 510 may include one or more output devices, including but not limited to a display interface, a speaker, a haptic feedback mechanism, a printer, any other mechanism capable of presenting an output to a user, or any combination thereof.

Figure 6:
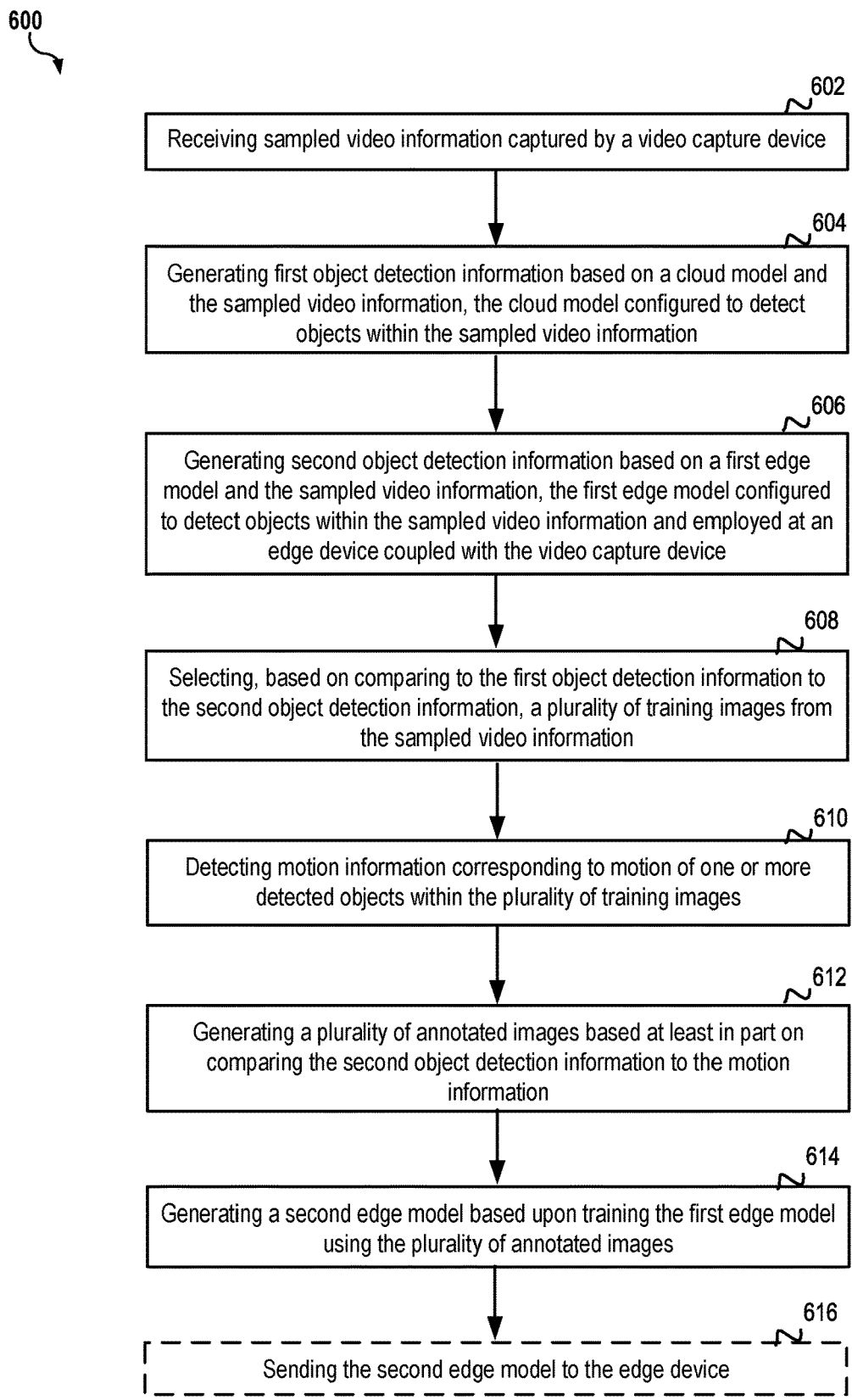
FIG. 6 is a flow diagram of an example method for dynamically updating deployed ML models, according to some implementations.

Referring to FIG. 6, in operation, the management service 102 or computing device 500 may perform an example method 600 for dynamically updating deployed ML models. The method 600 may be performed by one or more components of the management service 102, the computing device 500, or any device/component described herein according to the techniques described with reference to the previous figures.

At block 602, the method 600 includes receiving sampled video information captured by a video capture device. For example, the model management component 124 may receive the sampled video information 120 from the video capture device 104 and/or the edge device 110. Accordingly, the management service 102 or the processor 502 executing the model management component 124 may provide means for receiving sampled video information captured by a video capture device.

At block 604, the method 600 includes generating first object detection information based on a cloud model and the sampled video information, the cloud model configured to detect objects within the sampled video information. For example, the cloud model 122 may determine the object information 134 based on the sampled video information 120. In some aspects, the object information 134 may include one or more bounding representations detected within the image frames of the sampled video information 120. Accordingly, the management service 102 or the processor 502 executing the cloud model 122 may provide means for generating first object detection information based on a cloud model and the sampled video information, the cloud model configured to detect objects within the sampled video information.

At block 606, the method 600 includes generating second object detection information based on a first edge model and the sampled video information, the first edge model configured to detect objects within the sampled video information and employed at an edge device coupled with the video capture device. For example, the edge model 114 may determine the object information 116 based on the sampled video information 120. In some aspects, the object information 116 may include one or more bounding representations detected within the image frames of the sampled video information 120. Accordingly, the management service 102 or the processor 502 executing the edge model 114 may provide means for generating second object detection information based on a first edge model and the sampled video information, the first edge model configured to detect objects within the sampled video information and employed at an edge device coupled with the video capture device.

At block 608, the method 600 includes selecting, based on comparing the first object detection information to the second object detection information, a plurality of training images from the sampled video information. For example, the image selection component 126 may compare the object information 116 and the object information 134 to determine the plurality of training images 138 from the sampled video information 120. Accordingly, the management service 102 or the processor 502 executing the image selection component 126 may provide means for selecting, based on comparing the first object detection information to the second object detection information, a plurality of training images from the sampled video information.

At block 610, the method 600 includes detecting motion information corresponding to motion of one or more detected objects within the plurality of training images. For example, the motion detection component 128 may determine the motion detection information 142 based on the plurality of training images 138. In some aspects, the motion detection information 142 may include one or more bounding representations detected within the image frames of the plurality of training images 138. Accordingly, the management service 102 or the processor 502 executing the motion detection component 128 may provide means for detecting motion information corresponding to motion of one or more detected objects within the plurality of training images.

At block 612, the method 600 includes generating a plurality of annotated images based at least in part on comparing the first object detection information to the motion information. For example, the image annotation component 130 may determine the plurality of annotated images 140 based on the object information 134 and the motion detection information 142. Accordingly, the management service 102 or the processor 502 executing the image annotation component 130 may provide means for generating a plurality of annotated images based at least in part on comparing the first object detection information to the motion information.

At block 614, the method 600 includes generating a second edge model based upon training the first edge model using the plurality of annotated images, the second edge model to be employed at the video capture device or another video capture device. For example, the model training component 132 may generate the updated edge model 136 based on the plurality of annotated images 140 and the edge model 114. Accordingly, the management service 102 or the processor 502 executing the model training component 132 may provide means for generating a second edge model based upon training the first edge model using the plurality of annotated images, the second edge model to be employed at the video capture device or another video capture device.

At block 616, the method 600 optionally includes sending the second edge model to the edge device. For example, the model management component 124 may send the updated edge model 136(1) to the edge device 110(1). Upon receipt of the updated edge model 136(1), the edge device 110(1) may replace the edge model 114(1) with the updated edge model 136(1), and employ the updated edge model 136(1) to process video data 106 received from the video capture device 104. Accordingly, the management service 102 or the processor 502 executing the model management component 124 may provide means for sending the second edge model to the edge device.

In an alternative or additional aspect, the first object detection information includes a first plurality of bounding representations detected in a first image frame, the second object detection information includes a second plurality of bounding representations detected in the first image frame, and in order to select the plurality of training images from the sampled video information, the method 600 comprises selecting the first frame for the plurality of training images based on a count of the first plurality of bounding representations not equaling a count of the second plurality of bounding representations. Accordingly, the management service 102 or the processor 502 executing the image selection component 126 may provide means for selecting the first frame for the plurality of training images based on a count of the first plurality of bounding representations not equaling a count of the second plurality of bounding representations.

In an alternative or additional aspect, the first object detection information includes a first plurality of bounding representations detected in a first image frame, and the motion information includes a second plurality of bounding representations detected in the first image frame, and generating the plurality of annotated images comprises, and in order to generate the plurality of annotated images comprises, the method 600 comprises generating, based on a count of the first plurality of bounding representations equaling a count of the second plurality of bounding representations, a first annotated image of the plurality of annotated images including the first plurality of bounding representations. Accordingly, the management service 102 or the processor 502 executing the image annotation component 130 may provide means for generating, based on a count of the first plurality of bounding representations equaling a count of the second plurality of bounding representations, a first annotated image of the plurality of annotated images including the first plurality of bounding representations.

In an alternative or additional aspect, the first object detection information includes a first plurality of bounding representations detected in a first image frame, the second object detection information includes a second plurality of bounding representations detected in the first image frame, the motion information includes a third plurality of bounding representations detected in the first image frame, and in order to generate the plurality of annotated images comprises, the method 600 comprises determining that one or more bounding representations of the first plurality of bounding representations do not match any of the third plurality of bounding representations, determining that the one or more bounding representations of the first plurality of bounding representations match one or more bounding representations within the second object detection information, and generating a first annotated image of the plurality of annotated images including the first plurality of bounding representations.

Accordingly, the management service 102 or the processor 502 executing the image annotation component 130 may provide means for determining that one or more bounding representations of the first plurality of bounding representations do not match any of the third plurality of bounding representations, determining each of the one or more bounding representations of first plurality of bounding representations match a bounding representation within the second object detection information, and generating a first annotated image of the plurality of annotated images including the first plurality of bounding representations.

In an alternative or additional aspect, the first object detection information includes a first plurality of bounding representations detected in a first image frame, the second object detection information includes a second plurality of bounding representations detected in the first image frame, the motion information includes a third plurality of bounding representations detected in the first image frame, and in order to generate the plurality of annotated images comprises, the method 600 comprises determining that one or more bounding representations of the first image frame are within the second plurality of bounding representations and not within the plurality of bounding representations, determining that the one or more bounding representations do not match the third plurality of bounding representations, and generating a first annotated image of the plurality of annotated images including the one or more bounding representations. Accordingly, the management service 102 or the processor 502 executing the image annotation component 130 may provide means for determining that one or more bounding representations of the first image frame are within the second plurality of bounding representations and not within the plurality of bounding representations, determining that the one or more bounding representations do not match the third plurality of bounding representations, and generating a first annotated image of the plurality of annotated images including the one or more bounding representations.

In an alternative or additional aspect, the first object detection information includes a first plurality of bounding representations detected in a first image frame, the second object detection information includes a second plurality of bounding representations detected in the first image frame, the motion information includes a third plurality of bounding representations detected in the first image frame, and the method 600 further comprises determining a review context based at least in part on two of the first plurality of bounding representations, the second plurality of bounding representations, or the third plurality of bounding representations, receiving annotation information via a graphical user interface, and generating a second annotated image of the plurality of annotated images including the annotation information.

In an alternative or additional aspect, in order to generate the second edge model based upon training the first edge model using the plurality of annotated images, the method 600 comprises determining the second edge model based on at least a layer of the first edge model based on a transfer learning operation. Accordingly, the management service 102 or the processor 502 executing the model training component 132 may provide means for determining the second edge model based on at least a layer of the first edge model based on a transfer learning operation.

Figure 7:
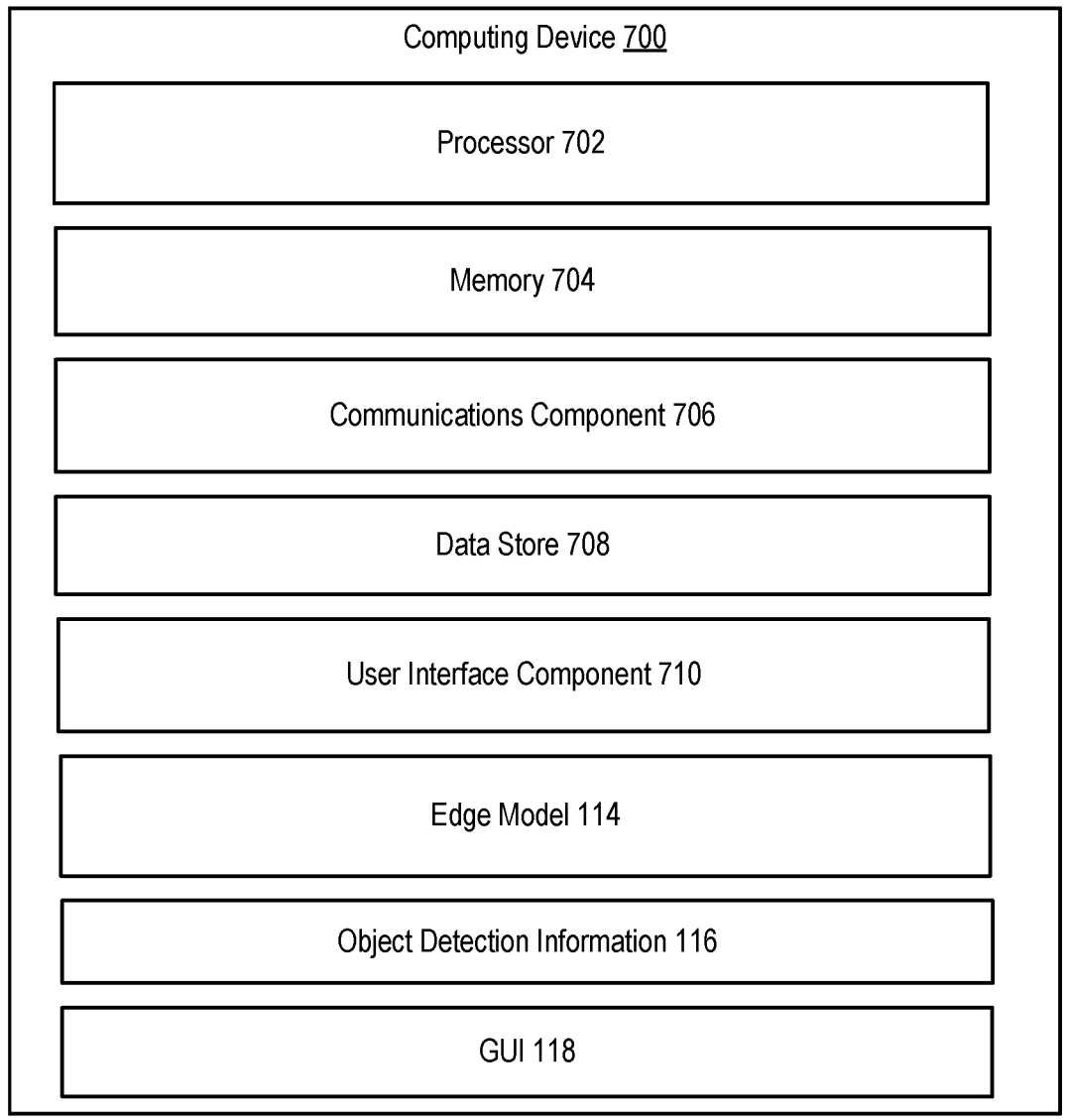
FIG. 7 is block diagram of an example of an edge device, according to some implementations.

Referring to FIG. 7, a computing device 700 may implement all or a portion of the functionality described herein. The computing device 700 may be or may include or may be configured to implement the functionality of at least a portion of the system 100, or any component therein. For example, the computing device 700 may be or may include or may be configured to implement the functionality of the video capture devices 104. The computing device 700 includes a processor 702 which may be configured to execute or implement software, hardware, and/or firmware modules that perform any functionality described herein. For example, the processor 702 may be configured to execute or implement software, hardware, and/or firmware modules that perform any functionality described herein with reference to the video capture device 104, or any other component/system/device described herein, e.g., the edge model 114, and/or the GUI 118.

The processor 702 may be a micro-controller, an application-specific integrated circuit (ASIC), a digital signal processor (DSP), or a field-programmable gate array (FPGA), and/or may include a single or multiple set of processors or multi-core processors. Moreover, the processor 702 may be implemented as an integrated processing system and/or a distributed processing system. The computing device 700 may further include a memory 704, such as for storing local versions of applications being executed by the processor 702, related instructions, parameters, etc. The memory 704 may include a type of memory usable by a computer, such as random access memory (RAM), read only memory (ROM), tapes, magnetic discs, optical discs, volatile memory, non-volatile memory, and any combination thereof. Additionally, the processor 702 and the memory 704 may include and execute an operating system executing on the processor 702, one or more applications, display drivers, and/or other components of the computing device 700.

Further, the computing device 700 may include a communications component 706 configured to establish and maintain communications with one or more other devices, parties, entities, etc. utilizing hardware, software, and services. The communications component 706 may carry communications between components on the computing device 700, as well as between the computing device 700 and external devices, such as devices located across a communications network and/or devices serially or locally connected to the computing device 700. In an aspect, for example, the communications component 706 may include one or more buses, and may further include transmit chain components and receive chain components associated with a wireless or wired transmitter and receiver, respectively, operable for interfacing with external devices.

Additionally, the computing device 700 may include a data store 708, which can be any suitable combination of hardware and/or software, that provides for mass storage of information, databases, and programs. For example, the data store 708 may be or may include a data repository for applications and/or related parameters not currently being executed by processor 702. In addition, the data store 708 may be a data repository for an operating system, application, display driver, etc., executing on the processor 702, and/or one or more other components of the computing device 700, e.g., the edge model 114, and/or the GUI 118.

The computing device 700 may also include a user interface component 710 operable to receive inputs from a user of the computing device 700 and further operable to generate outputs for presentation to the user (e.g., via a display interface to a display device). The user interface component 710 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 710 may include one or more output devices, including but not limited to a display interface, a speaker, a haptic feedback mechanism, a printer, any other mechanism capable of presenting an output to a user, or any combination thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method comprising:
   receiving sampled video information captured by a video capture device;
   generating first object detection information based on a cloud model and the sampled video information, the cloud model configured to detect objects within the sampled video information;
   generating second object detection information based on a first edge model and the sampled video information, the first edge model configured to detect objects within the sampled video information and employed at an edge device coupled with the video capture device;
   selecting, based on comparing the first object detection information to the second object detection information, a plurality of training images from the sampled video information;
   detecting motion information corresponding to motion of one or more detected objects within the plurality of training images;
   generating a plurality of annotated images based at least in part on comparing the first object detection information to the motion information; and
   generating a second edge model based upon training the first edge model using the plurality of annotated images.

2. The method of claim 1, further comprising sending the second edge model to the edge device.

3. The method of claim 1, wherein the first object detection information includes a first plurality of bounding representations detected in a first image frame, the second object detection information includes a second plurality of bounding representations detected in the first image frame, and selecting the plurality of training images from the sampled video information comprises:
   selecting the first image frame for the plurality of training images based on a count of the first plurality of bounding representations not equaling a count of the second plurality of bounding representations.

4. The method of claim 1, wherein the first object detection information includes a first plurality of bounding representations detected in a first image frame, the second object detection information includes a second plurality of bounding representations detected in the first image frame, and selecting the plurality of training images from the sampled video information comprises:
   discarding the first image frame based on a count of the first plurality of bounding representations equaling a count of the second plurality of bounding representations.

5. The method of claim 1, wherein the first object detection information includes a first plurality of bounding representations detected in a first image frame, and the motion information includes a second plurality of bounding representations detected in the first image frame, and generating the plurality of annotated images comprises:
   generating, based on a count of the first plurality of bounding representations equaling a count of the second plurality of bounding representations, a first annotated image of the plurality of annotated images including the first plurality of bounding representations.

6. The method of claim 1, wherein the first object detection information includes a first plurality of bounding representations detected in a first image frame, the second object detection information includes a second plurality of bounding representations detected in the first image frame, the motion information includes a third plurality of bounding representations detected in the first image frame, and generating the plurality of annotated images comprises:
  determining that one or more bounding representations of the first plurality of bounding representations do not match any of the third plurality of bounding representations;
  determining that each of the one or more bounding representations of the first plurality of bounding representations match a bounding representation within the second object detection information; and
  generating a first annotated image of the plurality of annotated images including the first plurality of bounding representations.

7. The method of claim 1, wherein the first object detection information includes a first plurality of bounding representations detected in a first image frame, the second object detection information includes a second plurality of bounding representations detected in the first image frame, the motion information includes a third plurality of bounding representations detected in the first image frame, and generating the plurality of annotated images comprises:
  determining that one or more bounding representations of the second plurality of bounding representations do not match any of the first plurality of bounding representations;
  determining that the one or more bounding representations do not match any of the third plurality of bounding representations; and
  generating a first annotated image of the plurality of annotated images including the first plurality of bounding representations.

8. The method of claim 1, wherein the first object detection information includes a first plurality of bounding representations detected in a first image frame, the second object detection information includes a second plurality of bounding representations detected in the first image frame, the motion information includes a third plurality of bounding representations detected in the first image frame, and further comprising:
  determining a review context based at least in part on two of the first plurality of bounding representations, the second plurality of bounding representations, or the third plurality of bounding representations;
  receiving annotation information via a graphical user interface; and
  generating a second annotated image of the plurality of annotated images including the annotation information.

9. The method of claim 1, wherein generating the second edge model based upon training the first edge model using the plurality of annotated images comprises:
  determining the second edge model based on at least a layer of the first edge model based on a transfer learning operation.

10. A system comprising:
  a memory storing instructions thereon; and
  at least one processor coupled with the memory and configured by the instructions to:
    receive sampled video information captured by a video capture device;
    generate first object detection information based on a cloud model and the sampled video information, the cloud model configured to detect objects within the sampled video information;
    generate second object detection information based on a first edge model and the sampled video information, the first edge model configured to detect objects within the sampled video information and employed at an edge device coupled with the video capture device;
    select, based on comparing the first object detection information to the second object detection information, a plurality of training images from the sampled video information;
    detect motion information corresponding to motion of one or more detected objects within the plurality of training images;
    generate a plurality of annotated images based at least in part on comparing the first object detection information to the motion information; and
    generate a second edge model based upon training the first edge model using the plurality of annotated images.

11. The system of claim 10, wherein the first object detection information includes a first plurality of bounding representations detected in a first image frame, the second object detection information includes a second plurality of bounding representations detected in the first image frame, and to select the plurality of training images from the sampled video information, the at least one processor is further configured by the instructions to:
  select the first image frame for the plurality of training images based on a count of the first plurality of bounding representations not equaling a count of the second plurality of bounding representations.

12. The system of claim 10, wherein the first object detection information includes a first plurality of bounding representations detected in a first image frame, the motion information includes a second plurality of bounding representations detected in the first image frame, and generating the plurality of annotated images comprises, and to generate the plurality of annotated images, the at least one processor is further configured by the instructions to:
  generate, based on a count of the first plurality of bounding representations equaling a count of the second plurality of bounding representations, a first annotated image of the plurality of annotated images including the first plurality of bounding representations.

13. The system of claim 10, the first object detection information includes a first plurality of bounding representations detected in a first image frame, the second object detection information includes a second plurality of bounding representations detected in the first image frame, the motion information includes a third plurality of bounding representations detected in the first image frame, and to generate the plurality of annotated images, the at least one processor is further configured by the instructions to:
  determine that one or more bounding representations of the first plurality of bounding representations do not match any of the third plurality of bounding representations;
  determine that each of the one or more bounding representations of first plurality of bounding representations matches a bounding representation within the second object detection information; and
  generate a first annotated image of the plurality of annotated images including the first plurality of bounding representations.

14. The system of claim 10, wherein the first object detection information includes a first plurality of bounding representations detected in a first image frame, the second object detection information includes a second plurality of bounding representations detected in the first image frame, the motion information includes a third plurality of bounding representations detected in the first image frame, and to generate the plurality of annotated images, the at least one processor is further configured by the instructions to:
  determine that one or more bounding representations of the second plurality of bounding representations do not match any of the first plurality of bounding representations;
  determine that the one or more bounding representations do not match any of the third plurality of bounding representations; and
  generate a first annotated image of the plurality of annotated images including the first plurality of bounding representations.

15. The system of claim 10, wherein the first object detection information includes a first plurality of bounding representations detected in a first image frame, the second object detection information includes a second plurality of bounding representations detected in the first image frame, the motion information includes a third plurality of bounding representations detected in the first image frame, the at least one processor is further configured by the instructions to:
  determine a review context based at least in part on two of the first plurality of bounding representations, the second plurality of bounding representations, or the third plurality of bounding representations;
  receive annotation information via a graphical user interface; and
  generate a second annotated image of the plurality of annotated images including the annotation information.

16. A non-transitory computer-readable device having instructions thereon that, when executed by at least one computing device, causes the at least one computing device to perform operations comprising:
  receiving sampled video information captured by a video capture device;
  generating first object detection information based on a cloud model and the sampled video information, the cloud model configured to detect objects within the sampled video information;
  generating second object detection information based on a first edge model and the sampled video information, the first edge model configured to detect objects within the sampled video information and employed at an edge device coupled with the video capture device;
  selecting, based on comparing the first object detection information to the second object detection information, a plurality of training images from the sampled video information;
  detecting motion information corresponding to motion of one or more detected objects within the plurality of training images;
  generating a plurality of annotated images based at least in part on comparing the first object detection information to the motion information; and
  generating a second edge model based upon training the first edge model using the plurality of annotated images, the second edge model to be employed at the video capture device or another video capture device.

17. The non-transitory computer-readable device of claim 16, wherein the first object detection information includes a first plurality of bounding representations detected in a first image frame, the second object detection information includes a second plurality of bounding representations detected in the first image frame, and selecting the plurality of training images from the sampled video information comprises:
  selecting the first image frame for the plurality of training images based on a count of the first plurality of bounding representations not equaling a count of the second plurality of bounding representations.

18. The non-transitory computer-readable device of claim 16, wherein the first object detection information includes a first plurality of bounding representations detected in a first image frame, and the motion information includes a second plurality of bounding representations detected in the first image frame, and generating the plurality of annotated images comprises:
  generating, based on a count of the first plurality of bounding representations equaling a count of the second plurality of bounding representations, a first annotated image of the plurality of annotated images including the first plurality of bounding representations.

19. The non-transitory computer-readable device of claim 16, wherein the first object detection information includes a first plurality of bounding representations detected in a first image frame, the second object detection information includes a second plurality of bounding representations detected in the first image frame, the motion information includes a third plurality of bounding representations detected in the first image frame, and generating the plurality of annotated images comprises:
  determining that one or more bounding representations of the first plurality of bounding representations do not match any of the third plurality of bounding representations;
  determining that each of the one or more bounding representations of the first plurality of bounding representations match a bounding representation within the second object detection information; and
  generating a first annotated image of the plurality of annotated images including the first plurality of bounding representations.

20. The non-transitory computer-readable device of claim 16, wherein the first object detection information includes a first plurality of bounding representations detected in a first image frame, the second object detection information includes a second plurality of bounding representations detected in the first image frame, the motion information includes a third plurality of bounding representations detected in the first image frame, and generating the plurality of annotated images comprises:
  determining that one or more bounding representations of the second plurality of bounding representations do not match any of the first plurality of bounding representations;
  determining that the one or more bounding representations do not match any of the third plurality of bounding representations; and
  generating a first annotated image of the plurality of annotated images including the first plurality of bounding representations.

* * * * *